(12) United States Patent
Jiang et al.

(10) Patent No.: US 9,019,487 B2
(45) Date of Patent: Apr. 28, 2015

(54) METHOD FOR DETECTING PARFOCALITY OF ZOOM-STEREO MICROSCOPE

(71) Applicant: Ningbo University, Ningbo, Zhejiang (CN)

(72) Inventors: Gangyi Jiang, Zhejiang (CN); Yigang Wang, Zhejiang (CN); Mei Yu, Zhejiang (CN); Zongju Peng, Zhejiang (CN); Feng Shao, Zhejiang (CN)

(73) Assignee: Ningbo University, Ningbo, Zhejiang Province (CN)

( * ) Notice: Subject to any disclaimer, the term of this patent is extended or adjusted under 35 U.S.C. 154(b) by 152 days.

(21) Appl. No.: 13/859,130

(22) Filed: Apr. 9, 2013

(65) Prior Publication Data
US 2014/0029000 A1 Jan. 30, 2014

(51) Int. Cl.
*G01B 9/00* (2006.01)
*G01M 11/02* (2006.01)
*G02B 21/24* (2006.01)

(52) U.S. Cl.
CPC .......... *G01M 11/02* (2013.01); *G01M 11/0264* (2013.01); *G01M 11/0292* (2013.01); *G02B 21/241* (2013.01)

(58) Field of Classification Search
USPC ................... 356/125, 318; 359/368
See application file for complete search history.

(56) References Cited

U.S. PATENT DOCUMENTS

| | | | |
|---|---|---|---|
| 2002/0015223 A1* | 2/2002 | Mecham et al. | 359/368 |
| 2007/0273877 A1* | 11/2007 | Kawano et al. | 356/318 |

* cited by examiner

*Primary Examiner* — Tarifur Chowdhury
*Assistant Examiner* — Jamil Ahmed

(57) ABSTRACT

A method for detecting a parfocality of a zoom-stereo microscope includes: acquiring four highest definitions corresponding to a plurality of images with a cooperation of four definition judging functions, acquiring a relatively clearest position according to the four highest definitions, comparing a definition in the relatively clearest position with a definition in a parfocal position to judge whether the relatively clearest position is the parfocal position, then adjusting a magnification of the zoom-stereo microscope to acquire the parfocal positions at a finite number of the discrete magnifications, and finally fitting a parfocal curve at the continuous magnifications. The method according to the present invention implements a parfocality detection of the stereo microscope automatically and effectively and increases a productivity, and has a high detecting precision. In addition, the method according to the present invention has a good robustness, so that users needn't intervene and adjust frequently.

16 Claims, 10 Drawing Sheets

METHOD FOR DETECTING PARFOCALITY OF ZOOM-STEREO MICROSCOPE

BACKGROUND OF THE PRESENT INVENTION

1. Field of Invention

The present invention relates to a method for detecting a parfocality of a stereo microscope, and more particularly to a method for detecting a parfocality of a zoom-stereo microscope.

2. Description of Related Arts

Stereo microscopes play a more and more important and valuable role in contemporary world industry. The stereo microscope is capable of observing a stereo image of an object, to further realize functions of stereoscopic measurement, automatic operation, three-dimensional reconstruction, etc. Especially in stereoscopic microoperation, precision control can be realized by sending instructions to manipulators, wherein the instructions are acquired via high resolution stereoscopic microscopic image processing. A zoom-stereo microscope is able to provide images which are always clear at different magnifications, to customers, therefore a requirement for the zoom-stereo microscope is also getting more and more. For a microscope, at a certain magnification, if a clear target image is obtained via adjustment, the position of the objective lens at the moment is called a parfocal position. If the clear target image can not be obtained via adjustment, the parfocal position doesn't exist. For a zoom lens set, if the clear target image can be obtained via adjustment at a high magnification, the target image should keep clear in a course of zooming to a low magnification, which is called parfocality. However, in delivery of the zoom lens sets, one or more lenses may shift due to vibration, etc., which causes a decrement of the parfocality. It means that the target image can not keep clear in the course of zooming to a low magnification from a high magnification, even at some magnification, the focal distance is required to be adjusted to obtain the clear target image, even worse, the clear target image can not be obtained via adjusting the focal distance and the parfocal position doesn't exist. Therefore an effective detection of the parfocality of the zoom lens sets will increase a productivity and a product quality of the stereo microscope.

Three problems should be solved in the detection of the parfocality of the zoom lens sets. The first problem is the judgment of definition, a relatively clearest position at present magnification can be obtained via a definition judging model; the second problem is the judgment of parfocality, whether the relatively clearest position at present magnification is the parfocal position can be judged via a parfocality judging model; the third problem is to fit a parfocality position curve at the continuous magnifications according to the parfocality positions detected under the discrete magnifications.

At present, an artificial observing method is adopted in the detection of the parfocality of the zoom lens sets. The artificial observing method comprises: adjusting the magnification of the stereo microscope to a maximum value firstly and adjusting the microscope to obtain a clear image; then decreasing the magnification, observing whether the image is clear, if the image is not clear, slightly adjusting the focal distance to obtain the clear image, and recording a clear position as the parfocal position; repeating the above steps to obtain a group of parfocal positions at different magnifications; and estimating the parfocal positions under the continuous magnifications by experience, according to the parfocal positions under the discrete magnifications, to further obtain an empirical curve. The artificial observing method is low in efficiency, and erroneous judgment easily happens to influence the product quality. On the other hand, when a product yield is increased and a full inspection of the product is required, a large number of detecting workers are required. Therefore the artificial observing method can only be applied in initial product trial-manufacturing stage, but in a mass production, a more efficient parfocality detecting method is required.

SUMMARY OF THE PRESENT INVENTION

An object of the present invention is to provide a method for detecting a parfocality of a zoom-stereo microscope, and the method has a high detecting precision, a high detecting efficiency, and a good robustness.

Accordingly, in order to accomplish the above object, the present invention provides a method for detecting a parfocality of a zoom-stereo microscope, comprising: ① turning a magnification knob of the zoom-stereo microscope, and adjusting a magnification thereof to M;

② turning a focusing knob of the zoom-stereo microscope, particularly turning clockwise or counterclockwise from a benchmark position, and then acquiring Q groups of images corresponding to Q different focusing knob angles, wherein each group consists of T images, a No. k image in the T images acquired at the magnification of M and the focusing knob angle of $\theta_s$ is denoted as $I_{M\theta_s k}$, Q≥7, T≥3, 1≤s≥Q, 1≤k≤T, when the focusing knob is turned clockwise, $-5° \leq \theta_s \leq 0°$, and when the focusing knob is turned counterclockwise, $0° \leq \theta_s \leq 5°$;

③ respectively calculating definitions of the Q×T images acquired at Q different focusing knob angles and the magnification of M according to four definition judging functions, respectively figuring out a highest definition in the Q×T definitions calculated according to each of the definition judging functions, and in the four focusing knob angles respectively corresponding to the four highest definitions, judging whether at least three focusing knob angles are in a same position, if yes, defining the focusing knob angles in the same position corresponding to the highest definitions as a relatively clearest position at the magnification of M, and if no, defining the focusing knob angle corresponding to the highest definition calculated according to the first definition judging function as the relatively clearest position at the magnification of M; and ④ according to operations in step ① to step ③, acquiring P relatively clearest positions respectively corresponding to P different magnifications, and then judging whether the P relatively clearest positions are all parfocal positions via a parfocality judging method, if yes, confirming a success of a parfocality detection and judging that the zoom-stereo microscope is a qualified product, and if no, confirming a failure of the parfocality detection and judging that the zoom-stereo microscope is an unqualified product, wherein P≥6.

The focusing knob angle is a relative angle between the position of the focusing knob and the benchmark position; if the focusing knob is turned clockwise from the benchmark position, the direction that the focusing knob is turned is defined as a negative direction, and if the focusing knob is turned counterclockwise from the benchmark, the direction that the focusing knob is turned is defined as a positive direction.

In the step ③, respectively calculating the definitions of the Q×T images acquired at Q different focusing knob angles and the magnification of M according to the four definition judging functions comprises:

③-1, respectively defining the four definition judging functions as a gradient square function, an image variance function, a discrete Fourier transform function and a Walsh-Hadamard transform function, and respectively denoting the four definition judging functions as $F_{C_1}(\ )$, $F_{C_2}(\ )$, $F_{C_3}(\ )$ and $F_{C_4}(\ )$;

③-2, in the Q×T images acquired at the Q different focusing knob angles, defining the No. k' image processed at present as a present image, denoted as $I_{Mk'}$, wherein $1 \le k' \le Q \times T$;

③-3, calculating a first definition of the present image according to the gradient square function $F_{C_1}(\ )$, and denoting the first definition as $F_{C_1}(I_{Mk'})$, wherein $$F_{C_1}(I_{Mk'}) = \sum_{x=\frac{W-N}{2}}^{\frac{W+N}{2}-1} \sum_{y=\frac{H-N}{2}}^{\frac{H+N}{2}-1} [(I_{Mk'}(x, y) - I_{Mk'}(x+1, y))^2 + (I_{Mk'}(x, y) - I_{Mk'}(x, y+1))^2],$$

W and H respectively represent a width and a height of the present image, a value of N is not larger than the width and the height of the present image and is an integer power of 2, $I_{Mk'}(x, y)$ represents a gray level of a pixel having a coordinate of (x, y) in the present image, $I_{Mk'}(x+1, y)$ represents a gray level of a pixel having a coordinate of (x+1, y) in the present image, and $I_{Mk'}(x, y+1)$ represents a gray level of a pixel having a coordinate of (x, y+1) in the present image;

③-4, calculating a second definition of the present image according to the image variance function $F_{C_2}(\ )$, and denoting the second definition as $F_{C_2}(I_{Mk'})$, wherein $$F_{C_2}(I_{Mk'}) = \sum_{x=\frac{W-N}{2}}^{\frac{W+N}{2}-1} \sum_{y=\frac{H-N}{2}}^{\frac{H+N}{2}-1} [(I_{Mk'}(x, y) - \overline{I_{Mk'}(x, y)})]^2,$$

and $$\overline{I_{Mk'}(x, y)} = \frac{1}{N^2} \sum_{x=\frac{W-N}{2}}^{\frac{W+N}{2}-1} \sum_{y=\frac{H-N}{2}}^{\frac{H+N}{2}-1} I_{Mk'}(x, y);$$

③-5, calculating a third definition of the present image according to the discrete Fourier transform function $F_{C_3}(\ )$, and denoting the third definition as $F_{C_3}(I_{Mk'})$, wherein $$F_{C_3}(I_{Mk'}) = \sum_{u=0}^{N-1} \sum_{v=0}^{N-1} F_{Mk'}(u, v),$$

$F_{Mk'}(u, v)$ represents a discrete Fourier transform of $I_{Mk'}(x, y),$ $$F_{Mk'}(u, v) = \sum_{x=\frac{W-N}{2}}^{\frac{W+N}{2}-1} \sum_{y=\frac{H-N}{2}}^{\frac{H+N}{2}-1} I_{Mk'}(x, y)e^{-j2\pi(\frac{ux}{N}+\frac{vy}{N})},$$

and j represents a imaginary unit;

③-6, calculating a fourth definition of the present image according to the Walsh-Hadamard transform function $F_{C_4}(\ )$, and denoting the fourth definition as $F_{C_4}(I_{Mk'})$, wherein $$F_{C_4}(I_{Mk'}) = \sum_{u=0}^{N-1} \sum_{v=0}^{N-1} W_{Mk'}(u, v),$$

$W_{Mk'}(u, v)$ represents a Walsh-Hadamard transform of $I_{Mk'}(x, y)$, $$W_{Mk'}(u, v) = \frac{1}{N^2} \sum_{x=\frac{W-N}{2}}^{\frac{W+N}{2}-1} \sum_{y=\frac{H-N}{2}}^{\frac{H+N}{2}-1} w_N(u, x) I_{Mk'}(x, y) w_N(v, y),$$

wherein $w_N(u, x)$ and $w_N(v, y)$ both represent kernel functions of the Walsh-Hadamard transform, $$w_N(u, x) = \prod_{r=0}^{p-1} (-1)^{u_r u_x},$$

and $$w_N(v, y) = \prod_{r=0}^{p-1} (-1)^{v_r v_y},$$

$p = \log_2 N$, $u_r$ represents a No. r digit of a binary form of u, $u_x$ represents a No. x digit of the binary form of u, $v_r$ represents a No. r digit of a binary form of v, and $v_y$ represents a No. y digit of the binary form of v; and ③-7, let k'=k'+1, wherein "=" is an assignment symbol, in the Q×T images acquired at the Q different focusing knob angles, defining a next image to be processed as the present image, and then returning to the step ③-3, until acquiring four definitions of each of the Q×T images acquired at the Q different focusing knob angles.

In the step ④, judging whether the relatively clearest position at each of the P different magnifications is the parfocal position according to the parfocality judging method comprises:

④-1, turning a magnification knob of another zoom-stereo microscope, then acquiring P parfocal clear images at the P different magnifications with a calibration target, forming a group of reference images with the P parfocal clear images, and defining the parfocal clear image acquired with the calibration target at the magnification of $M_{p'}$ as the reference image at the magnification of $M_{p'}$, wherein $M_{p'}$ is a No. p' magnification in the P different magnifications, the reference image is denoted as $I_{M_{p'}}$, and $1 \le p' \le P$;

④-2, respectively calculating P definitions of the P reference images corresponding to the P different magnifications according to the gradient square function $F_{C_1}(\ )$, and denoting the definition of the reference image $I_{M_{p'}}$ acquired at the magnification of $M_{p'}$ as $F_{C_1}(I_{M_{p'}})$, wherein is the No. p' magnification in the P different magnifications, and $$F_{C_1}(I_{M_{p'}}) = \sum_{x'=\frac{W'-N'}{2}}^{\frac{W'+N'}{2}-1} \sum_{y'=\frac{H'-N'}{2}}^{\frac{H'+N'}{2}-1} [(I_{M_{p'}}(x', y') - I_{M_{p'}}(x'+1, y'))^2 + (I_{M_{p'}}(x', y') - I_{M_{p'}}(x', y'+1))^2],$$

wherein W' and H' respectively represent a width and a height of the reference image, a value of N' is not larger than the width and the height of the reference image and is an integer power of 2, $I_{M_{p'}}(x', y')$ represents a gray level of a pixel having a coordinate of (x', y') in the reference image $I_{M_{p'}}$ acquired at the magnification of $M_{p'}$, $I_{M_{p'}}(x'+1, y')$ represents a gray level of a pixel having a coordinate of (x'+1, y') in the reference image $I_{M_{p'}}$ acquired at the magnification of $M_{p'}$, and $I_{M_{p'}}(x', y'+1)$ represents a gray level of a pixel having a coordinate of (x', y'+1) in the reference image $I_{M_{p'}}$ acquired at the magnification of $M_{p'}$; and ④-3, respectively comparing the P relatively clearest positions at the P different magnifications acquired in the operations in step ① to step ③ with P parfocal positions of the P reference images acquired at the P different magnifications one by one, judging whether the relatively clearest position at each of the P different magnifications acquired in the operations in step ① to step ③ is the parfocal position, for the relatively clearest position at the magnification of $M_{p'}$ acquired in the operations in step ① to step ③, wherein $M_{p'}$ is the No. p' magnification in the P different magnifications, setting a judging condition of the relatively clearest position as $$\text{Parfocality} = \begin{cases} \text{parfocal,} & \text{if } \frac{\left|F_{C_1}(I_{M_{p'}}) - F_{C_1}(I_{M_{p'},\theta^{M_{p'}}})\right|}{F_{C_1}(I_{M_{p'}})} < \alpha_{p'} \\ \text{not parfocal,} & \text{if } \frac{\left|F_{C_1}(I_{M_{p'}}) - F_{C_1}(I_{M_{p'},\theta^{M_{p'}}})\right|}{F_{C_1}(I_{M_{p'}})} \geq \alpha_{p'}, \end{cases}$$

wherein $\theta^{M_{p'}}$ represents a focusing knob angle corresponding to the relatively clearest position at the magnification of $M_{p'}$ in the P different magnifications acquired in the operations in step ① to step ③, $$F_{C_1}(I_{M_{p'},\theta^{M_{p'}}})$$

represents a highest definition corresponding to the relatively clearest position in the magnification of $M_{p'}$ in the P different magnification, calculated according to the gradient square function $F_{C_1}(\ )$ in the operations in step ① to step ③, the symbol "||" is an absolute value symbol, and $\alpha_{p'}$ represents a threshold value for judging the parfocality at the magnification of $M_{p'}$.

A value of $\alpha_{p'}$ in step ④-3 depends on the magnification, when the magnification is 6.5, the value of $\alpha_{p'}$ is 0.30%; when the magnification is 5, the value of $\alpha_{p'}$ is 0.56%; when the magnification is 4, the value of $\alpha_{p'}$ is 0.06%; when the magnification is 2, the value of $\alpha_{p'}$ is 1.40%; when the magnification is 1, the value of $\alpha_{p'}$ is 0.038%; and when the magnification is 0.8, the value of $\alpha_{p'}$ is 0.10%.

In the step ④, after the zoom-stereo microscope is judged as the qualified product, a parfocal curve of the zoom-stereo microscope is fitted, and that is to fit the parfocal curve of the zoom-stereo microscope via a least square method, according to the parfocal positions at each of the P different magnifications acquired in step ④, the parfocal curve is represented in a polynomial form as $d(M)=a_0+a_1M+a_2M^2+L+a_LM^L$, wherein d represents a distance between an objective lens and an objective table of the zoom-stereo microscope when the zoom-stereo microscope is parfocal, d(M) represents the parfocal curve consisting of the distances between the objective lens and the objective table corresponding to the parfocal positions at each of the P different magnifications acquired in step ④, M represents the magnification, $M^2$ represents a second power of M, $M^L$ represents a No. L power of M, $M \in \{M_1, M_2, L, M_{P-1}, M_P\}$, $M_1, M_2, L, M_{P-1}, M_P$ represent the P different magnifications, $a_0, a_1, a_2, \ldots, a_L$ represent undetermined coefficients in $d(M)=a_0+a_1M+a_2M^2+L+a_LM^L$, and L represents an order of the parfocal curve.

In the step ④, after the zoom-stereo microscope is judged as the qualified product, the parfocal curve of the zoom-stereo microscope is fitted, which comprises:

a, calculating a height of the objective lens of the zoom-stereo microscope at each of the P different magnifications acquired in the step ④, and denoting the height of the objective lens at the parfocal position of $\theta^{M_{p'}}$ and the magnification of $M_{p'}$ as $d_{M_{p'}}$, wherein $M_{p'}$ is the No. p' magnification in the P different magnifications, $d_{M_{p'}}=d_0+\theta^{M_{p'}} \times \Delta d$, $d_0$ represents the height of the objective lens when the focusing knob is in the benchmark position, $\Delta d$ represents a distance the objective lens moves after the focusing knob is turned by 1 degree, $$\Delta d = \frac{d_{max} - d_{min}}{n},$$

$d_{max}$ represents the height of the objective lens when the focusing knob adjusts the objective lens to a highest position, $d_{min}$ represents the height of the objective lens when the focusing knob adjusts the objective lens to a lowest position, n represents the degrees the focusing knob is turned by in a course that the focusing knob adjusts the objective lens from the lowest position to the highest position, and a unit of n is degree;

b, forming P discrete points with each magnification in the P different magnifications and the corresponding height of the objective lens, for $M_{p'}$, which is the No. p' magnification in the P different magnifications, forming the discrete point with $M_{p'}$ and the corresponding height of the objective lens $d_{M_{p'}}$, and denoting the discrete point as $(M_{p'}, d_{M_{p'}})$;

c, constructing the parfocal curve of the zoom-stereo microscope, which is denoted as $d(M)=a_0+a_1M+a_2M^2+L+a_LM^L$, acquiring sum of squares of errors of the P discrete points according to $d(M)=a_0+a_1M+a_2M^2+L+a_LM^L$, wherein sum of squares of errors of the P discrete points is denoted as $T(a_0, a_1, L, a_L)$, $$T(a_0, a_1, L, a_L) \sum_{i=1}^{P} ((a_0 + a_1 M_i + a_2 M_i^2 + L + a_L M_i^L) - d_{M_i})^2,$$

and a partial derivative of each of undetermined coefficients in $$T(a_0, a_1, L, a_L) = \sum_{i=1}^{P} ((a_0 + a_1 M_i + a_2 M_i^2 + L + a_L M_i^L) - d_{M_i})^2$$

is set to zero to minimize $T(a_0, a_1, L, a_L)$, namely $$\frac{\partial T}{\partial a_l} = 2 \sum_{i=1}^{P} ((a_0 + a_1 M_i + a_2 M_i^2 + L + a_L M_i^L) - d_{M_i}) M_i^l = 0,$$

wherein $M_i$ represents a No. i magnification in the P different magnifications, $d_{M_i}$ represents the height of the objective lens of the zoom-stereo microscope corresponding to the parfocal position at the magnification of $M_i$, $M_i^1$ represents a No. 1 power of $M_i$, and $1 \leq l \leq L$; and d, calculating values of the undetermined coefficients in $d(M)=a_0+a_1M+a_2M^2+L+a_LM^L$ according to the step c, and finally acquiring the parfocal curve of the zoom-stereo microscope according to the values of the undetermined coefficients.

The height of the objective lens is a distance between a bottom of the objective lens and the objective table.

The benchmark position is the position of the focusing knob when the image is relatively clearest at the highest magnification and the focusing knob angle is 0 degree.

Compared to the prior art, the present invention is advanced in acquiring the four highest definitions corresponding to a plurality of the images with a cooperation of the four definition judging functions, acquiring the relatively clearest position according to the four highest definitions, comparing the definition in the relatively clearest position with the definition in the parfocal position to judge whether the relatively clearest position is the parfocal position, then adjusting the magnification of the zoom-stereo microscope to acquire the parfocal positions at a finite number of the discrete magnifications, and finally fitting the parfocal curve at the continuous magnifications. The parfocality of the stereo microscope can be detected automatically and effectively in the present invention, and the detecting precision is high, in such a manner that productivity will be increased effectively; additionally, the method according to the present invention has a good robustness, so that users needn't intervene and adjust frequently. The method is suitable for the parfocality detections of majority of the stereo microscopes. The method can increase the productivity drastically, when cooperating with automatic devices.

These and other objectives, features, and advantages of the present invention will become apparent from the following detailed description, the accompanying drawings, and the appended claims.

DETAILED DESCRIPTION OF THE PREFERRED EMBODIMENT

The present invention will be further described as followed.

Figure 1:
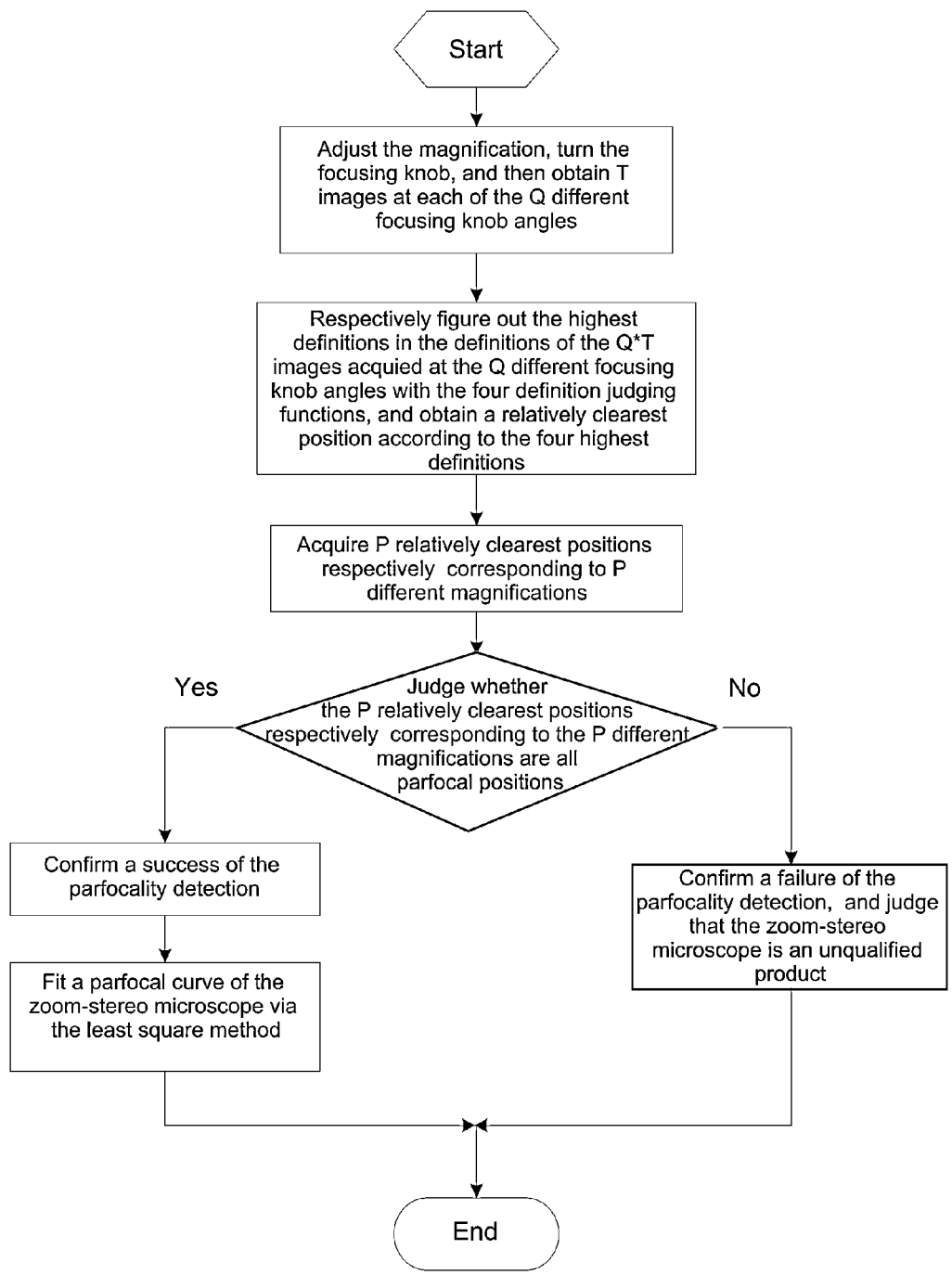
FIG. 1 is a flow block diagram of a method for detecting a parfocality of a zoom-stereo microscope according to a preferred embodiment of the present invention.
Figure 2A:
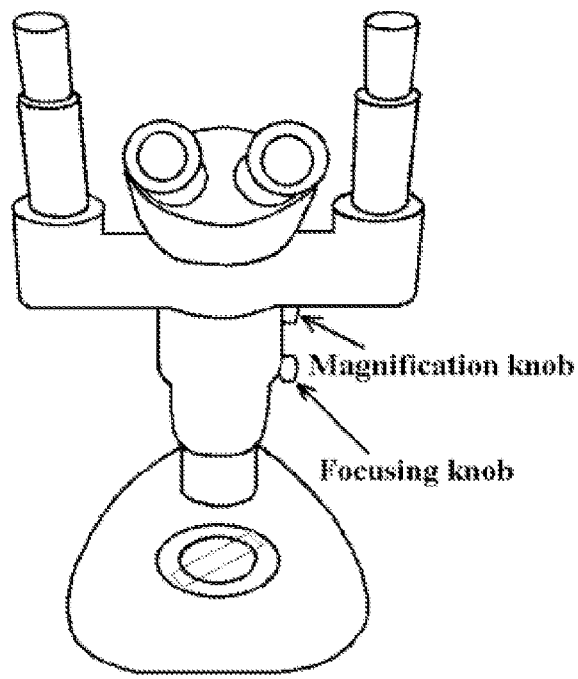
FIG. 2a is a sketch view of the zoom-stereo microscope.
Figure 3A:
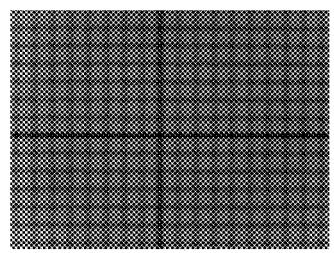
FIG. 3a is a picture acquired when a magnification is 5 and a focusing knob is turned clockwise by 4°, namely $\theta_s=4°$.
Figure 3B:
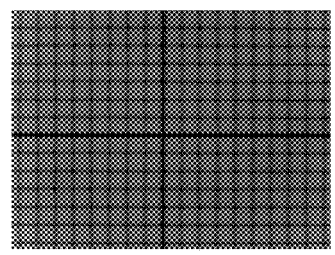
FIG. 3b is a picture acquired when the magnification is 5 and the focusing knob is turned clockwise by 3°, namely $\theta_s=3°$.
Figure 3C:
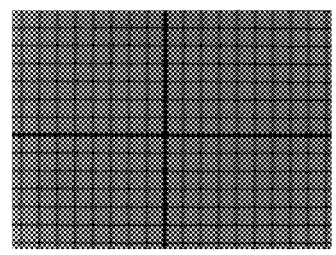
FIG. 3c is a picture acquired when the magnification is 5 and the focusing knob is turned clockwise by 2°, namely $\theta_s=-2°$.
Figure 3D:
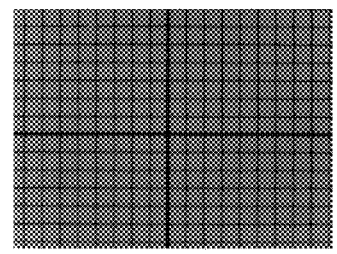
FIG. 3d is a picture acquired when the magnification is 5 and the focusing knob is turned clockwise by 1°, namely $\theta_s=-1°$.
Figure 3E:
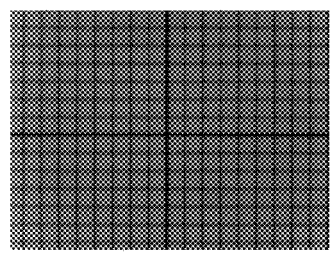
FIG. 3e is a picture acquired when the magnification is 5 and the focusing knob is at a benchmark position, namely $\theta_s=0°$.
Figure 3F:
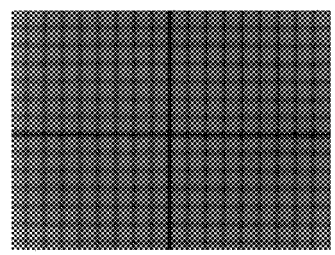
FIG. 3f is a picture acquired when the magnification is 5 and the focusing knob is turned counterclockwise by 1°, namely $\theta_s=1°$.
Figure 3G:
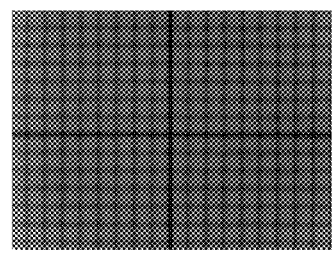
FIG. 3g is a picture acquired when the magnification is 5 and the focusing knob is turned counterclockwise by 2°, namely $\theta_s=2°$.
Figure 4A:
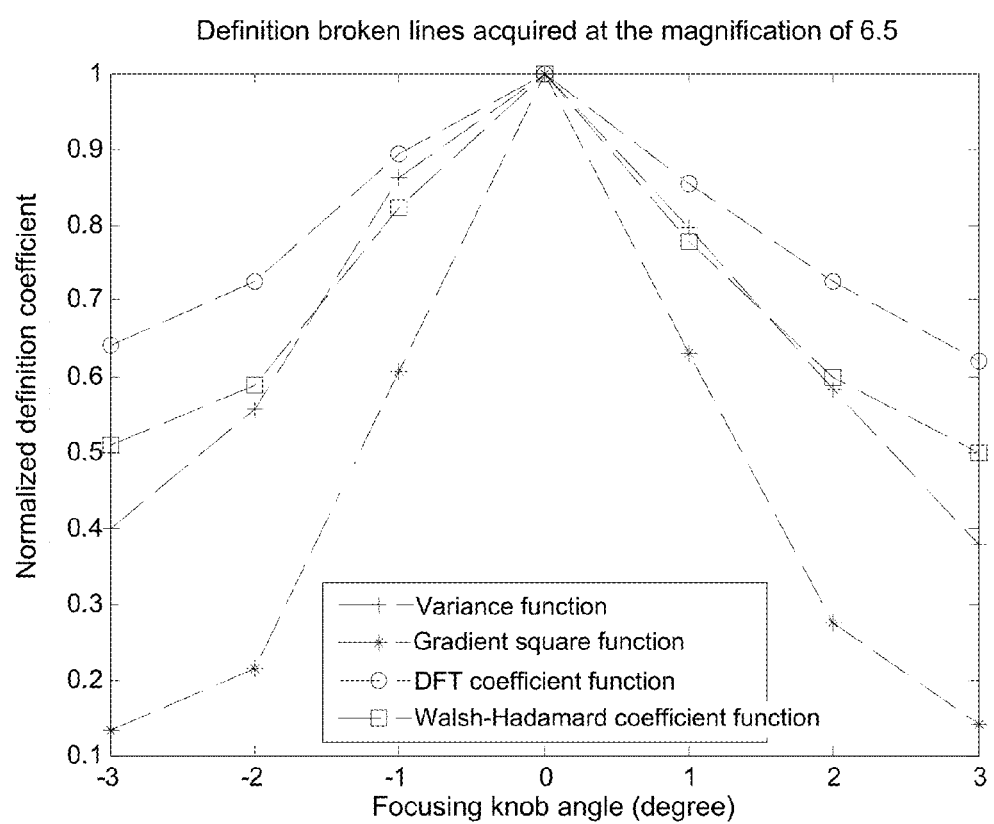
FIG. 4a is a definition broken line graph illustrating definitions of images acquired at 7 different focusing knob angles and the magnification of 6.5 respectively calculated according to four definition judging functions.
Figure 4B:
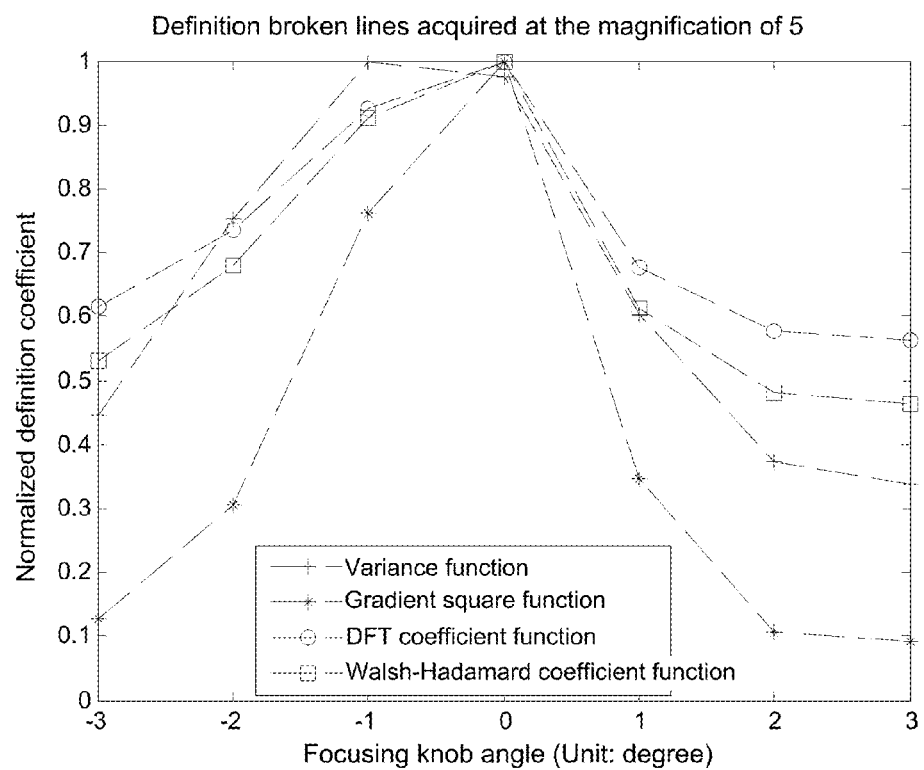
FIG. 4b is a definition broken line graph illustrating definitions of images acquired at the 7 different focusing knob angles and the magnification of 5 respectively calculated according to the four definition judging functions.
Figure 4C:
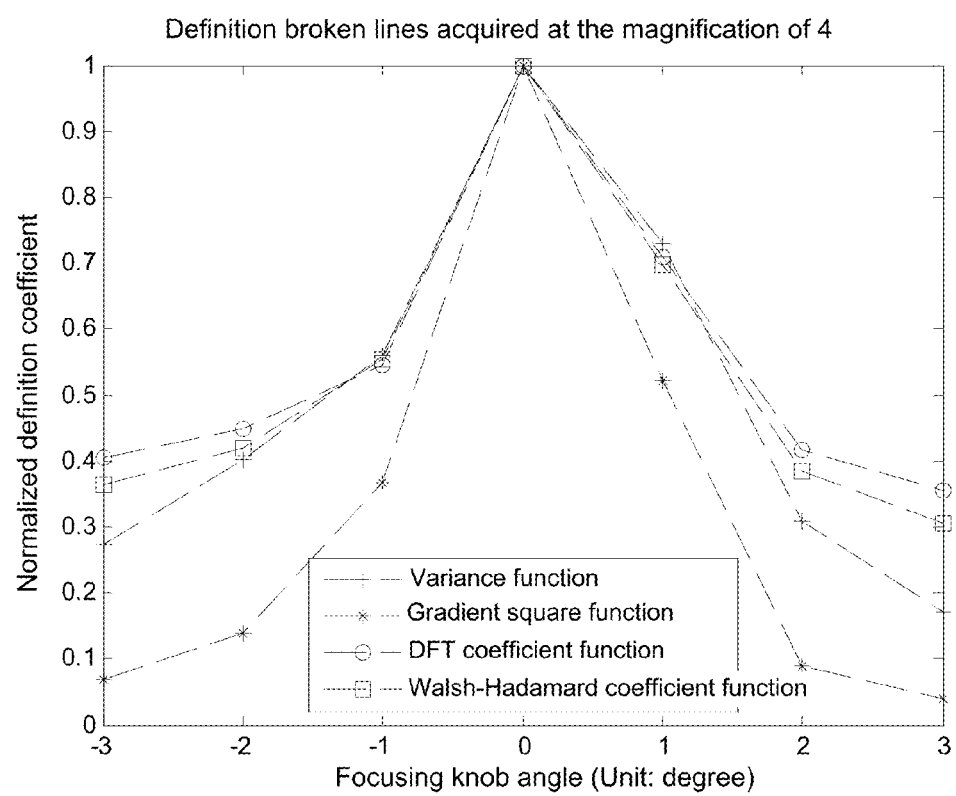
FIG. 4c is a definition broken line graph illustrating definitions of images acquired at the 7 different focusing knob angles and the magnification of 4 respectively calculated according to the four definition judging functions.
Figure 4D:
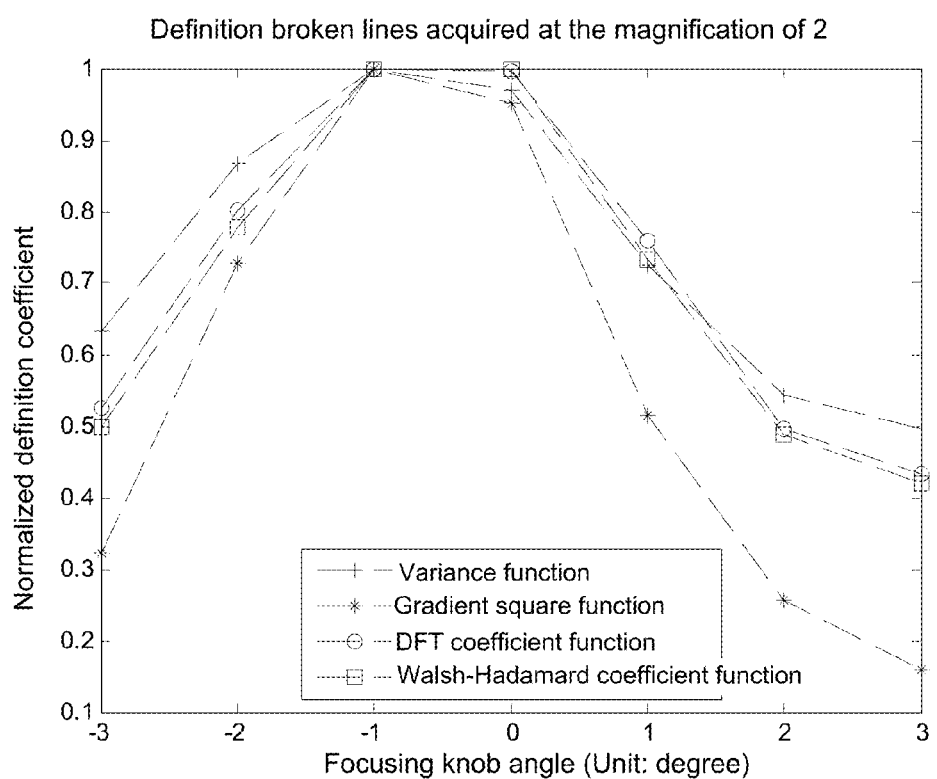
FIG. 4d is a definition broken line graph illustrating definitions of images acquired at the 7 different focusing knob angles and the magnification of 2 respectively calculated according to the four definition judging functions.
Figure 4E:
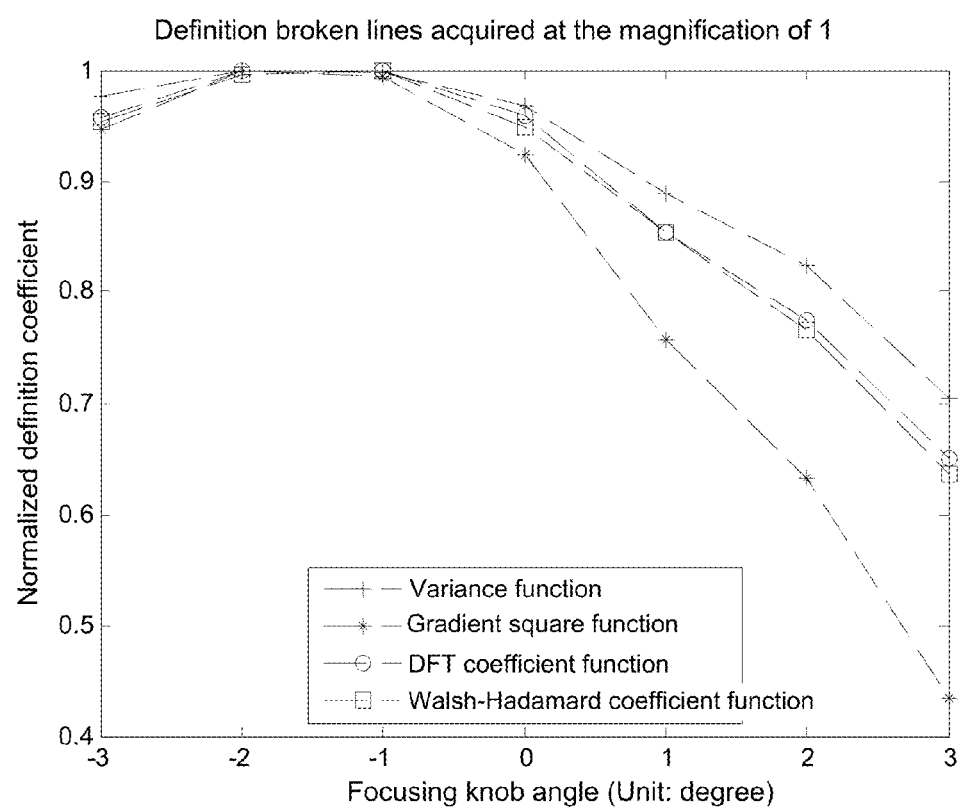
FIG. 4e is a definition broken line graph illustrating definitions of images acquired at the 7 different focusing knob angles and the magnification of 1 respectively calculated according to the four definition judging functions.
Figure 4F:
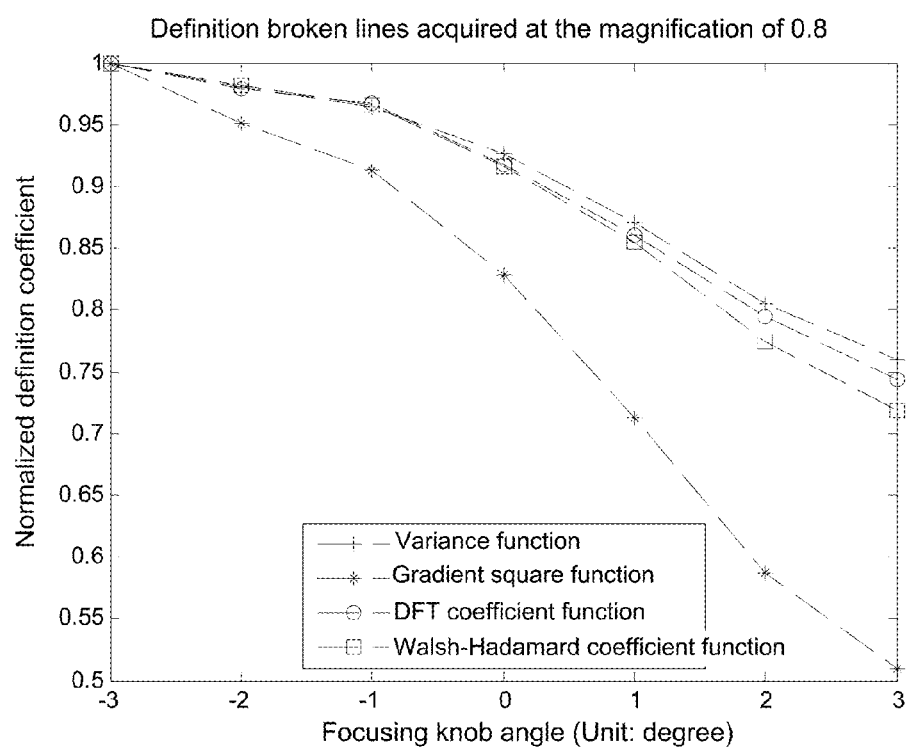
FIG. 4f is a definition broken line graph illustrating definitions of images acquired at the 7 different focusing knob angles and the magnification of 0.8 respectively calculated according to the four definition judging functions.

Referring to FIG. 2a, a zoom-stereo microscope comprises two adjusting knobs, namely a magnification knob for adjusting a magnification of the zoom-stereo microscope and a focusing knob for adjusting a focal distance of the zoom-stereo microscope. The present invention provides a method for detecting a parfocality of a zoom-stereo microscope, and a flow block diagram of the method is shown in FIG. 1. The method comprises:

① turning the magnification knob of the zoom-stereo microscope, and adjusting the magnification thereof to M;

② turning the focusing knob of the zoom-stereo microscope, particularly turning clockwise or counterclockwise from a benchmark position, and then acquiring Q groups of images corresponding to Q different focusing knob angles, namely $\theta_1, \theta_2, L, \theta_s, L, \theta_Q$, wherein each group consists of T images, and a No. k image in the T images acquired at the magnification of M and the focusing knob angle of $\theta_s$ is denoted as $I_{M\theta_sk}$, wherein $Q \geq 7$, $T \geq 3$, $1 \leq s \leq Q$, and $1 \leq k \leq T$;

in this embodiment, Q=7, T=3, the benchmark position is a position of the focusing knob when the image is relatively clearest at the highest magnification and the focusing knob angle is 0 degree, the focusing knob angle is a relative angle between the position of the focusing knob and the benchmark position, if the focusing knob is turned clockwise from the benchmark position, the direction that the focusing knob is turned is defined as a negative direction, if the focusing knob is turned counterclockwise from the benchmark, the direction that the focusing knob is turned is defined as a positive direction, when the focusing knob is turned clockwise, usually $-5° \leq \theta_Q<L<\theta_s<L<\theta_2<\theta_1 \leq 0°$, however, in order to increase a detecting precision in practice, a range of the focusing knob angle is narrowed properly, e.g. $-3° \leq \theta_Q<L<\theta_s<L<\theta_2<\theta_1 \leq 0°$, similarly, when the focusing knob is turned counterclockwise, $0° \leq \theta_1 < \theta_2 < L < \theta_s < L < \theta_Q \leq 5°$, however, in order to increase the detecting precision in practice, the range of the focusing knob angle is narrowed properly, e.g. $0° \leq \theta_1 < \theta_2 < L < \theta_s < L < \theta_Q \leq 3°$;

in this embodiment, the subject of the zoom-stereo microscope is a calibration target having minimum grids of 0.1 mm, a resolution of the images acquired with the digital camera is 1600×1200, FIG. 3a, FIG. 3b, FIG. 3c and FIG. 3d respectively show the images acquired when the magnification is 5 and the focusing knob is turned clockwise by 4°, 3°, 2° and 1°, FIG. 3e shows the image acquired when the magnification is 5 and the focusing knob is in the benchmark position, and FIG. 3f and FIG. 3g respectively show the images acquired when the magnification is 5 and the focusing knob is turned counterclockwise by 1° and 2°;

③ respectively calculating definitions of the Q×T images acquired at Q different focusing knob angles and the magnification of M according to four definition judging functions, that is to say respectively calculating the definition of each image in the Q×T images according to the first definition judging function to acquire Q×T definitions, respectively calculating the definition of each image in the Q×T images according to the second definition judging function to acquire Q×T definitions, respectively calculating the definition of each image in the Q×T images according to the third definition judging function to acquire Q×T definitions, and respectively calculating the definition of each image in the Q×T images according to the fourth definition judging function to acquire Q×T definitions, then figuring out a highest definition in the Q×T definitions calculated according to each of the four definition judging functions to acquire four highest definitions altogether, denoting a focusing knob angle corresponding to the highest definition in the Q×T definitions calculated according to the first definition judging function as $\theta^{C_1}$, denoting a focusing knob angle corresponding to the highest definition in the Q×T definitions calculated according to the second definition judging function as $\theta^{C_2}$, denoting a focusing knob angle corresponding to the highest definition in the Q×T definitions calculated according to the third definition judging function as $\theta^{C_3}$, denoting a focusing knob angle corresponding to the highest definition in the Q×T definitions calculated according to the fourth definition judging function as $\theta^{C_4}$, wherein $\theta^{C_1}, \theta^{C_2}, \theta^{C_3}$ and $\theta^{C_4}$ are all in the $\{\theta_1, \theta_2, L, \theta_s, L, \theta_Q\}$, and judging whether at least three focusing knob angles in the four focusing knob angles corresponding to the four highest definitions are in a same position, if yes, defining the focusing knob angles in the same position corresponding to the highest definitions as a relatively clearest position at the magnification of M, and if no, defining the focusing knob angle corresponding to the highest definition calculated according to the first definition judging function, namely $\theta^{C_1}$, as the relatively clearest position at the magnification of M;

in the above embodiment, wherein respectively calculating the definitions of the Q×T images acquired at Q different focusing knob angles and the magnification of M according to the four definition judging functions comprises:

③-1, respectively defining the four definition judging functions as a gradient square function, an image variance function, a discrete Fourier transform function and a Walsh-Hadamard transform function, and respectively denoting the four definition judging functions as $F_{C_1}(\ )$ $F_{C_2}(\ )$, $F_{C_3}(\ )$ and $F_{C_4}(\ )$;

③-2, in the Q×T images acquired at the Q different focusing knob angles, defining a No. k' image processed at present as a present image, and denoting the present image as $I_{Mk'}$, wherein $1 \leq k' \leq Q \times T$;

③-3, calculating a first definition of the present image according to the gradient square function $F_{C_1}(\ )$, and denoting the first definition as $F_{C_1}(I_{Mk'})$, wherein $$F_{C_1}(I_{Mk'}) = \sum_{x=\frac{W-N}{2}}^{\frac{W+N}{2}-1} \sum_{y=\frac{H-N}{2}}^{\frac{H+N}{2}-1} [(I_{Mk'}(x,y) - I_{Mk'}(x+1,y))^2 + (I_{Mk'}(x,y) - I_{Mk'}(x,y+1))^2],$$

W and H respectively represent a width and a height of the present image, preferably W=1600 and H=1200, a value of N is not larger than the width and the height of the present image and is an integer power of 2, preferably N=1024, $I_{Mk'}(x,y)$ represents a gray level of a pixel having a coordinate of $(x, y)$ in the present image, $I_{Mk'}(x+1, y)$ represents a gray level of a pixel having a coordinate of $(x+1, y)$ in the present image, and $I_{Mk'}(x, y+1)$ represents a gray level of a pixel having a coordinate of $(x, y+1)$ in the present image;

③-4, calculating a second definition of the present image according to the image variance function $F_{C_2}(\ )$, and denoting the second definition as $F_{C_2}(I_{Mk'})$, wherein $$F_{C_2}(I_{Mk'}) = \sum_{x=\frac{W-N}{2}}^{\frac{W+N}{2}-1} \sum_{y=\frac{H-N}{2}}^{\frac{H+N}{2}-1} [(I_{Mk'}(x,y) - \overline{I_{Mk'}(x,y)})]^2,$$

and $$\overline{I_{Mk'}(x,y)} = \frac{1}{N^2} \sum_{x=\frac{W-N}{2}}^{\frac{W+N}{2}-1} \sum_{y=\frac{H-N}{2}}^{\frac{H+N}{2}-1} I_{Mk'}(x,y);$$

③-5, calculating a third definition of the present image according to the discrete Fourier transform function $F_{C_3}(\ )$, and denoting the third definition as $F_{C_3}(I_{Mk'})$, wherein $$F_{C_3}(I_{Mk'}) = \sum_{u=0}^{N-1} \sum_{v=0}^{N-1} F_{Mk'}(u,v),$$

$F_{Mk'}(u, v)$ represents a discrete Fourier transform of $$I_{Mk'}(x,y),$$

$$F_{Mk'}(u,v) = \sum_{x=\frac{W-N}{2}}^{\frac{W+N}{2}-1} \sum_{y=\frac{H-N}{2}}^{\frac{H+N}{2}-1} I_{Mk'}(x,y) e^{-j2\pi(\frac{ux}{N} + \frac{vy}{N})},$$

and j represents a imaginary unit;

③-6, calculating a fourth definition of the present image according to the Walsh-Hadamard transform function $F_{C_4}(\ )$, and denoting the fourth definition as $F_{C_4}(I_{Mk'})$, wherein $$F_{C_4} = (I_{Mk'}) = \sum_{u=0}^{N-1} \sum_{v=0}^{N-1} W_{Mk'}(u,v),$$

$W_{Mk'}(u, v)$ represents a Walsh-Hadamard transform of $I_{Mk'}(x, y)$, $$W_{M_{k'}}(u, v) = \frac{1}{N^2} \sum_{x=\frac{W-N}{2}}^{\frac{W+N}{2}-1} \sum_{y=\frac{H-N}{2}}^{\frac{H+N}{2}-1} w_N(u, x) I_{M_{k'}}(x, y) w_N(v, y),$$

$w_N(u, x)$ and $w_N(v, y)$ both represent kernel functions of the Walsh-Hadamard transform, $$w_n(u, x) = \prod_{r=0}^{p-1} (-1)^{u_r u_x},$$

$$w_N(v, y) = \prod_{r=0}^{p-1} (-1)^{v_r v_x},$$

$p = \log_2 N$, $u_r$ represents a No. r digit of a binary form of u, $u_x$ represents a No. x digit of the binary form of u, $v_r$ represents a No. r digit of a binary form of v, and $v_y$ represents a No. y digit of the binary form of v; and ③-7, let k'=k'+1, wherein "=" is an assignment symbol, in the Q×T images acquired at the Q different focusing knob angles, defining a next image to be processed as the present image, then returning to the step ③-3, until acquiring four definitions of each of the Q×T images acquired at the Q different focusing knob angles.

FIG. 4a, FIG. 4b, FIG. 4c, FIG. 4d, FIG. 4e and FIG. 4f respectively show the definitions of the images acquired at the magnifications of 6.5, 5, 4, 2, 1, 0.8 and 7 different focusing knob angles of 3°, 2°, 1°, 0°, 1°, 2°, 3°, wherein the definitions is calculated according to the four definition judging functions.

④ according to operations in step ① to step ③, acquiring P relatively clearest positions corresponding to P different magnifications, and then judging whether the P relatively clearest positions are all parfocal positions via a parfocality judging method, if yes, confirming a success of a parfocality detection and judging that the zoom-stereo microscope is a qualified product, and if no, confirming a failure of the parfocality detection and judging that the zoom-stereo microscope is an unqualified product, wherein P≥6, preferably P=6, in practice, a plurality of magnifications can be chosen in accordance with specific conditions, the more magnifications are chosen, the higher the detecting precision of the parfocality is, but a computational complexity will be increased simultaneously, therefore P=6 is usually chosen so that whether the zoom-stereo microscope is the qualified product is able to be judged correctly, and values of the P different magnifications can be chosen in accordance with specific conditions.

In the above embodiment, in step ④, whether the relatively clearest position at each of the P different magnifications is the parfocal position is judged according to the parfocality judging method, which comprises:

④-1, turning a magnification knob of another zoom-stereo microscope to set a magnification thereof to M, and then acquiring a parfocal clear image with a calibration target, defining the parfocal clear image as a reference image denoted as $I_M$, in such a manner that a parfocal clear image is able to be acquired at each of the P different magnifications via adjusting the magnification, and a group of reference images can further be acquired, wherein the reference image at the magnification of $M_{p'}$ is denoted as $I_{M_{p'}}$, and $M_{p'}$ is the No. p' magnification in the P different magnifications, and 1≤p'≤P;

④-2, calculating P definitions of the reference images acquired at each of the P different magnifications according to the gradient square function $F_{C_1}( )$, and denoting the definition of the reference image $I_{M_{p'}}$ acquired at the magnification of $M_{p'}$ as $F_{C_1}(I_{M_{p'}})$, wherein $M_{p'}$ is the No. p' magnification in the P different magnifications, $$F_{C_1}(I_{M_{p'}}) = \sum_{x'=\frac{W'-N'}{2}}^{\frac{W'+N'}{2}-1} \sum_{y'=\frac{H'-N'}{2}}^{\frac{H'+N'}{2}-1} \left[ (I_{M_{p'}}(x', y') - I_{M_{p'}}(x'+1, y'))^2 + (I_{M_{p'}}(x', y') - I_{M_{p'}}(x', y'+1))^2 \right],$$

W' and H' respectively represent a width and a height of the reference image, wherein preferably W'=1600 and H'=1200, a value of N' is not larger than the width and the height of the reference image and is an integer power of 2, wherein preferably N'=1024, $I_{M_{p'}}(x', y')$ represents a gray level of a pixel having a coordinate of (x', y') in the reference image $I_{M_{p'}\, acquired\, at\, the\, magnification\, of\, M_{p'}}$, $I_{M_{p'}}(x'+1, y')$ represents a gray level of a pixel having a coordinate of (x'+1, y') in the reference image $I_{M_{p'}}$ acquired at the magnification of $M_{p'}$, and $I_{M_{p'}}(x', y'+1)$ represents a gray level of a pixel having a coordinate of (x', y'+1) in the reference image $I_{M_{p'}}$ acquired at the magnification of $M_{p'}$; and ④-3, comparing the relatively clearest position at each of the P different magnifications acquired in the operations in step ① to step ③ with the parfocal position of the reference image acquired at each of the P different magnifications one by one, judging whether the relatively clearest position at each of the P different magnifications acquired in the operations in step ① to step ③ is the parfocal position, for the relatively clearest position at the magnification of $M_{p'}$ acquired in the operations in step ① to step ③, wherein $M_{p'}$ is the No. p' magnification in the P different magnifications, setting a judging condition of the relatively clearest position as $$\text{Parfocality} = \begin{cases} \text{parfocal}, & \text{if } \frac{|F_{C_1}(I_{M_{p'}}) - F_{C_1}(I_{M_{p'}, \theta^{M_{p'}}})|}{F_{C_1}(I_{M_{p'}})} < \alpha_{p'} \\ \text{not parfocal}, & \text{if } \frac{|F_{C_1}(I_{M_{p'}}) - F_{C_1}(I_{M_{p'}, \theta^{M_{p'}}})|}{F_{C_1}(I_{M_{p'}})} \geq \alpha_{p'}, \end{cases}$$

wherein $\theta^{M_{p'}}$ represents the focusing knob angle corresponding to the relatively clearest position at the magnification of $M_{p'}$ in the P different magnifications acquired in the operations in step ① to step ③, $$F_{C_1}(I_{M_{p'}, \theta^{M_{p'}}})$$

represents the highest definition corresponding to the relatively clearest position at the magnification of $M_{p'}$ in the P different magnification, calculated according to the gradient square function $F_{C_1}( )$ in the operations in step ① to step ③, the symbol "||" is an absolute value symbol, and $\alpha_{p'}$ represents a threshold value for judging the parfocality at the magnification of $M_{p'}$.

In the above embodiment, when the magnification is 6.5, $\alpha_{p'}$ is 0.30%; when the magnification is 5, $\alpha_{p'}$ is 0.56%; when the magnification is 4, $\alpha_{p'}$ is 0.06%; when the magnification is 2, $\alpha_{p'}$ is 1.40%; when the magnification is 1, $\alpha_{p'}$ is 0.038%; when the magnification is 0.8, $\alpha_{p'}$ is 0.10%; herein, other values of $\alpha_{p'}$ can be acquired via a large number of experiments based on contents recorded in step ① to step ④.

Whether the relatively clearest position at each of the P different magnifications acquired according to the operations in step ① to step ③ is the parfocal position is judged according to the above step ④-1 to step ④-3; when the relatively clearest position at each of the magnifications is the parfocal position, the parfocality detection is confirmed to be successful; however, these parfocal positions are discrete magnitudes, so these discrete magnitudes are fitted to acquire a parfocal curve of the zoom-stereo microscope in the embodiment, that is to fit the parfocal curve of the zoom-stereo microscope via a least square method, according to the parfocal positions at each of the P different magnifications; the parfocal curve is represented in a polynomial form as $d(M) = a_0 + a_1 M + a_2 M^2 + L + a_L M^L$, wherein d represents a distance between an objective lens and an objective table of the zoom-stereo microscope when the zoom-stereo microscope is parfocal, d(M) represents the parfocal curve, consisting of the distances between the objective lens and the objective table corresponding to the parfocal positions at the P different magnifications acquired in the step ④, namely consisting of the distances d between the objective lens and the objective table when the zoom-stereo microscope is parfocal at each of the P different magnifications, M represents the magnification, $M^2$ represents a second power of M, $M^L$ represents a No. L power of M, $M \in \{M_1, M_2, L, M_{P-1}, M_P\}$, $M_1, M_2, L, M_{P-1}, M_P$ represent the P different magnifications, $a_0, a_1, a_2, \ldots, a_L$ represent undetermined coefficients in $d(M) = a_0 + a_1 M + a_2 M^2 + L + a_L M^L$, L represents an order of the parfocal curve, and a value of L is usually set near P, e.g. when P=6 in the embodiment, the value of L is 3, 5, or 8. Fitting the parfocal curve of the zoom-stereo microscope comprises:

a, calculating a height of the objective lens of the zoom-stereo microscope at each of the P different magnifications acquired in the step ④, when the parfocal position is at $\theta^{M_{p'}}$, denoting the height of the objective lens as $d_{M_{p'}}$, wherein $M_{p'}$ is the No. p' magnification in the P different magnifications, $\theta^{M_{p'}}$ is the parfocal position at the magnification of $M_{p'}$, $d_{M_{p'}} = d_0 + \theta^{M_{p'}} \times \Delta d$, $d_0$ represents the height of the objective lens when the focusing knob is in the benchmark position, $\Delta d$ represents a distance the objective lens moves after the focusing knob is turned by 1 degree, $$\Delta d = \frac{d_{max} - d_{min}}{n},$$

Figure 2B:
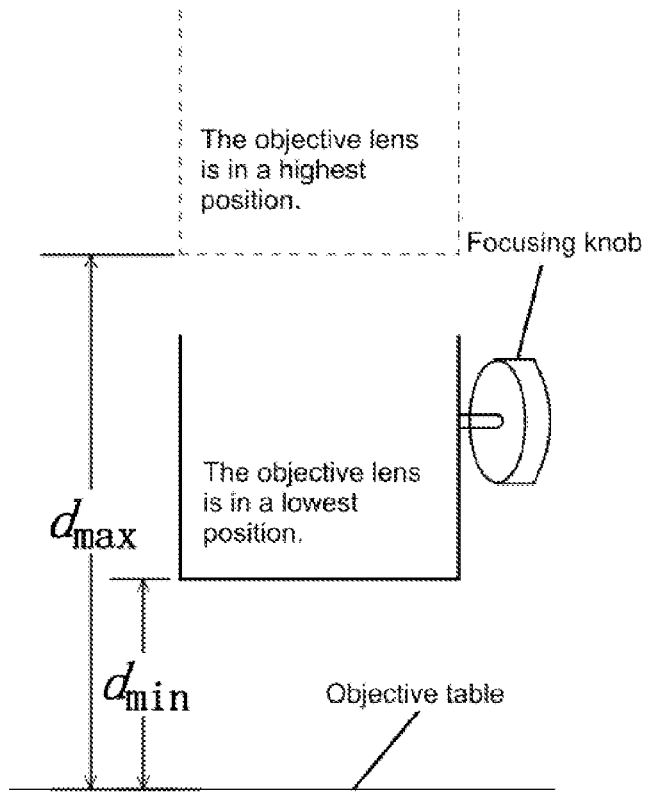
FIG. 2b is a sketch view illustrating positions of an objective lens and an objective table of the zoom-stereo microscope.
Figure 5:
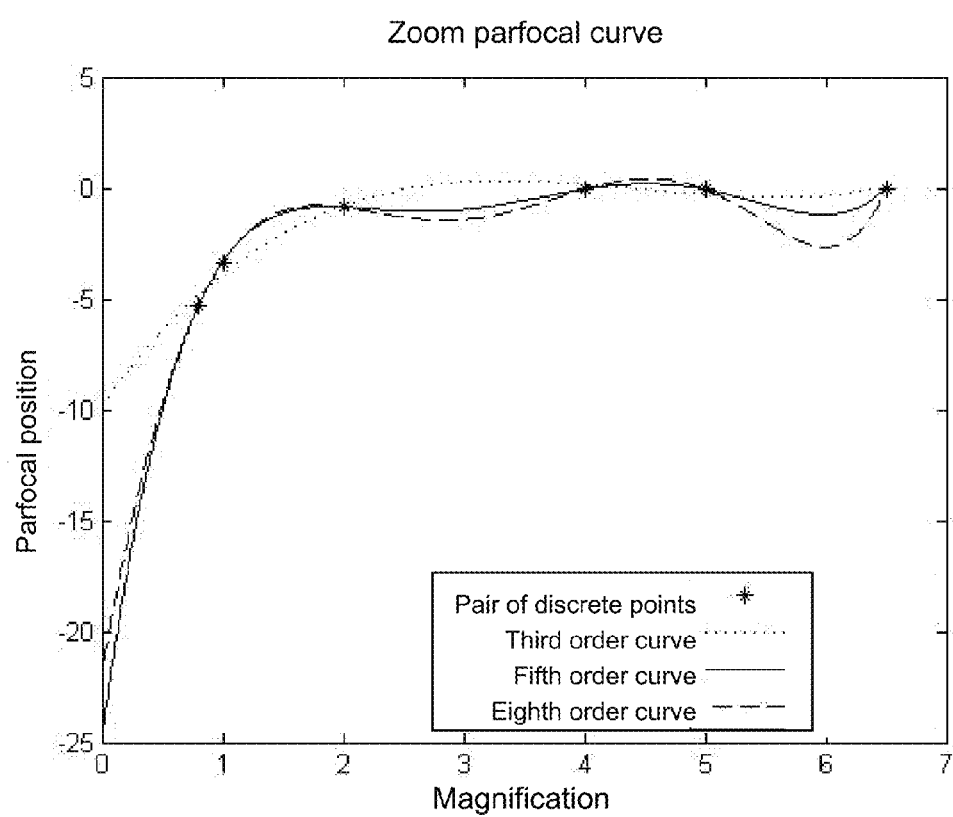
FIG. 5 is $3^{rd}$, $5^{th}$ and $8^{th}$ parfocal curves of the zoom-stereo microscope.

$d_{max}$ represents the height of the objective lens when the focusing knob adjusts the objective lens to a highest position, $d_{min}$ represents the height of the objective lens when the focusing knob adjusts the objective lens to a lowest position, n represents the degrees the focusing knob is turned by in a course that the focusing knob adjusts the objective lens from the lowest position to the highest position, a unit of n is degree, as shown in $d_{M_{p'}} = d_0 + \theta^{M_{p'}} \times \Delta d$, and a one-to-one correspondence exists between the focusing knob angle and the height of the objective lens, wherein the focusing knob angle is the relative angle between the focusing knob and the benchmark position;

wherein it's worth mentioning that the height of the objective lens is a distance between a bottom of the objective lens and the objective table, and FIG. 2b is a sketch view of positions of the objective lens and the objective table of the zoom-stereo microscope.

b, forming P discrete points with each magnification in the P different magnifications and the corresponding height of the objective lens, for $M_{p'}$, which is the No. p' magnification in the P different magnifications, forming the discrete point with $M_{p'}$ and the corresponding height of the objective lens $d_{M_{p'}}$, and denoting the discrete point as $(M_{p'}, d_{M_{p'}})$;

c, constructing the parfocal curve of the zoom-stereo microscope, denoted as $d(M) = a_0 + a_1 M + a_2 M^2 + L + a_L M^L$, acquiring sum of squares of errors of the P discrete points according to $d(M) = a_0 + a_1 M + a_2 M^2 + L + a_L M^L$, wherein the sum of squares of errors of the P discrete points is denoted as $T(a_0, a_1, L, a_L)$, $$T(a_0, a_1, L, a_L) = \sum_{i=1}^{P} ((a_0 + a_1 M_i + a_2 M_i^2 + L + a_L M_i^L) - d_{M_i})^2,$$

and a partial derivative of each of undetermined coefficients in $$T(a_0, a_1, L, a_L) = \sum_{i=1}^{P} ((a_0 + a_1 M_i + a_2 M_i^2 + L + a_L M_i^L) - d_{M_i})^2$$

is set to zero to minimize $T(a_0, a_1, L, a_L)$, namely $$\frac{\partial T}{\partial a_l} = 2 \sum_{i=1}^{P} ((a_0 + a_1 M_i + a_2 M_i^2 + L + a_L M_i^L) - d_{M_i}) M_i^l = 0,$$

wherein $M_i$ represents a No. i magnification in the P different magnifications, $d_{M_{p'}}$ represents the height of the objective lens of the zoom-stereo microscope corresponding to the parfocal position at the magnification of $M_i$, $M_i^l$ represents a No. l power of $M_i$, and $1 \leq l \leq L$; and d, acquiring a system of linear equations consisting of L equations according to step c, calculating values of the undetermined coefficient in $d(M) = a_0 + a_1 M + a_2 M^2 + L + a_L M^L$ according to the system of linear equations, and finally acquiring the parfocal curve $d(M) = a_0 + a_1 M + a_2 M^2 + L + a_L M^L$ according to the values of the undetermined coefficients. FIG. 5 shows $3^{rd}$, $5^{th}$, and $8^{th}$ parfocal curves fitted finally, as shown in FIG. 5, the $3^{rd}$ parfocal curve, namely L=3, doesn't pass through all of the 6 discrete points, so that an error is large, the $8^{th}$ parfocal curve, namely L=8, passes through all of the 6 discrete points, but an amplitude of fluctuation of the curve is large, the $5^{th}$ parfocal curve, namely L=5, passes through all of the 6 discrete points, and the amplitude of fluctuation is less, so adopting the $5^{th}$ parfocal curve has a best effect.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for detecting a parfocality of a zoom-stereo microscope, comprising:

①turning a magnification knob of the zoom-stereo microscope, and adjusting a magnification thereof to M;

② turning a focusing knob of the zoom-stereo microscope, particularly turning clockwise or counterclockwise from a benchmark position, and then acquiring Q groups of images corresponding to Q different focusing knob angles, wherein each group consists of T images, a No. k image in the T images acquired at the magnification of M and the focusing knob angle of $\theta_s$ is denoted as $I_{M\theta_s k}$, Q≥7, T≥3, 1≤s≤Q, 1≤k≤T, when the focusing knob is turned clockwise, $-5°\le\theta_s\le0°$, and when the focusing knob is turned counterclockwise, $0°\le\theta_s\le5°$;

③ respectively calculating definitions of the Q×T images acquired at Q different focusing knob angles and the magnification of M, according to four definition judging functions, then figuring out a highest definition of the Q×T definitions calculated according to each of the definition judging functions, and in the four focusing knob angles respectively corresponding to the four highest definitions, judging whether at least three focusing knob angles in the four focusing knob angles are in a same position, if yes, defining the focusing knob angles in the same position corresponding to the highest definitions as a relatively clearest position at the magnification of M, and if no, defining the focusing knob angle corresponding to the highest definition calculated according to the first definition judging function as the relatively clearest position at the magnification of M; and ④ according to operations of step ① to step ③, acquiring P relatively clearest positions respectively corresponding to P different magnifications, and then judging whether the P relatively clearest positions are all parfocal positions via a parfocality judging method, if yes, confirming a success of a parfocality detection and judging that the zoom-stereo microscope is a qualified product, if no, confirming a failure of the parfocality detection and judging that the zoom-stereo microscope is an unqualified product, wherein P≥6.

2. The method for detecting the parfocality of the zoom-stereo microscope, as recited in claim 1, wherein the focusing knob angle is a relative angle between the position of the focusing knob and the benchmark position, if the focusing knob is turned clockwise from the benchmark position, the direction that the focusing knob is turned is defined as a negative direction, and if the focusing knob is turned counterclockwise from the benchmark, the direction that the focusing knob is turned is defined as a positive direction.

3. The method for detecting the parfocality of the zoom-stereo microscope, as recited in claim 2, wherein respectively calculating the definitions of the Q×T images acquired at Q different focusing knob angles and the magnification of M according to the four definition judging functions in the step ③, comprises:

③-1, respectively defining the four definition judging functions as a gradient square function, an image variance function, a discrete Fourier transform function and a Walsh-Hadamard transform function, and respectively denoting the four definition judging functions as $F_{C_1}(\ )$, $F_{C_2}(\ )$, $F_{C_3}(\ )$ and $F_{C_4}(\ )$;

③-2, in the Q×T images acquired at the Q different focusing knob angles, defining the No. k' image processed at present as a present image, denoted as $I_{Mk'}$, wherein 1≤k'≤Q×T;

③-3, calculating a first definition of the present image according to the gradient square function $F_{C_1}(\ )$, and denoting the first definition as $F_{C_1}(I_{Mk'})$, wherein $$F_{C_1} = (I_{Mk'}) = \sum_{x=\frac{W-N}{2}}^{\frac{W+N}{2}-1} \sum_{y=\frac{H-N}{2}}^{\frac{H+N}{2}-1} [(I_{Mk'}(x,y) - I_{Mk'}(x+1,y))^2 + (I_{Mk'}(x,y) - I_{Mk'}(x,y+1))^2],$$

W and H respectively represent a width and a height of the present image, a value of N is not larger than the width and the height of the present image and is an integer power of 2, $I_{Mk'}(x, y)$ represents a gray level of a pixel having a coordinate of (x, y) in the present image, $I_{Mk'}(x+1, y)$ represents a gray level of a pixel having a coordinate of (x+1, y) in the present image, $I_{Mk'}(x, y+1)$ represents a gray level of a pixel having a coordinate of (x, y+1) in the present image;

③-4, calculating a second definition of the present image according to the image variance function $F_{C_2}(\ )$, and denoting the second definition as $F_{C_2}(I_{Mk'})$, wherein $$F_{C_2} = (I_{Mk'}) = \sum_{x=\frac{W-N}{2}}^{\frac{W+N}{2}-1} \sum_{y=\frac{H-N}{2}}^{\frac{H+N}{2}-1} [(I_{Mk'}(x,y) - \overline{I_{Mk'}(x,y)})]^2,$$

and $$\overline{I_{Mk'}(x,y)} = \frac{1}{N^2} \sum_{x=\frac{W-N}{2}}^{\frac{W+N}{2}-1} \sum_{y=\frac{H-N}{2}}^{\frac{H+N}{2}-1} I_{Mk'}(x,y);$$

③-5, calculating a third definition of the present image according to the discrete Fourier transform function $F_{C_3}(\ )$, and denoting the third definition as $F_{C_3}(I_{Mk'})$, wherein $$F_{C_3}(I_{Mk'}) = \sum_{u=0}^{N-1} \sum_{v=0}^{N-1} F_{Mk'}(u,v),$$

$F_{Mk'}(u, v)$ represents a discrete Fourier transform of $I_{Mk'}(x, y)$, $$F_{Mk'}(u,v) = \sum_{x=\frac{W-N}{2}}^{\frac{W+N}{2}-1} \sum_{y=\frac{H-N}{2}}^{\frac{H+N}{2}-1} I_{Mk'}(x,y)e^{-j2\pi\left(\frac{ux}{N}+\frac{vy}{N}\right)},$$

and j represents a imaginary unit;

③-6, calculating a fourth definition of the present image according to the Walsh-Hadamard transform function $F_{C_4}(\ )$, and denoting the fourth definition as $F_{C_4}(I_{Mk'})$, wherein $$F_{C_4}(I_{Mk'}) = \sum_{u=0}^{N-1} \sum_{v=0}^{N-1} W_{Mk'}(u,v),$$

$W_{Mk'}(u, v)$ represents a Walsh-Hadamard transform of $I_{Mk'}(x, y)$, $$W_{Mk'}(u, v) = \frac{1}{N^2} \sum_{x=\frac{W-N}{2}}^{\frac{W+N}{2}-1} \sum_{y=\frac{H-N}{2}}^{\frac{H+N}{2}-1} w_N(u, x) I_{Mk'}(x, y) w_N(v, y),$$

wherein $w_N(u, x)$ and $w_N(v, y)$ both represent kernel functions of the Walsh-Hadamard transform, $$w_N(u, x) = \prod_{r=0}^{p-1} (-1)^{u_r u_x},$$

and $$w_N(v, y) = \prod_{r=0}^{p-1} (-1)^{v_r v_y},$$

$p=\log_2 N$, $u_r$ represents a No. r digit of a binary form of u, $u_x$ represents a No. x digit of the binary form of u, $v_r$ represents a No. r digit of a binary form of v, and $v_y$ represents a No. y digit of the binary form of v; and ③-7, let k'=k'+1, wherein "=" is an assignment symbol, in the Q×T images acquired at the Q different focusing knob angles, defining a next image to be processed as the present image, and then returning to the step ③-3, until acquiring four definitions of each of the Q×T images acquired at the Q different focusing knob angles.

4. The method for detecting the parfocality of the zoom-stereo microscope, as recited in claim 3, wherein whether the relatively clearest position at each of the P different magnifications is the parfocal position is judged according to the parfocality judging method, which comprises:

④-1, turning a magnification knob of another zoom-stereo microscope, then acquiring P parfocal clear images at the P different magnifications with a calibration target, forming a group of reference images with the P parfocal clear images, and defining the parfocal clear image acquired with the calibration target at the magnification of $M_{p'}$ as the reference image at the magnification of $M_{p'}$, wherein $M_{p'}$ is a No. p' magnification in the P different magnifications, the reference image is denoted as $I_{M_{p'}}$ and $1 \leq p' \leq P$;

④-2, calculating P definitions of the reference images acquired at each of the P different magnifications according to the gradient square function $F_{C_1}(\ )$ denoting the definition of the reference image $I_{M_{p'}}$ acquired at the magnification of $M_{p'}$ as $F_{C_1}(I_{M_{p'}})$, wherein $M_{p'}$ is the No. p' magnification in the P different magnifications, $$F_{C_1} = (I_{M_{p'}}) = \sum_{x'=\frac{W'-N'}{2}}^{\frac{W'+N'}{2}-1} \sum_{y'=\frac{H'-N'}{2}}^{\frac{H'+N'}{2}-1} [(I_{M_{p'}}(x', y') - I_{M_{p'}}(x'+1, y'))^2 + (I_{M_{p'}}(x', y') - I_{M_{p'}}(x', y'+1))^2],$$

W' and H' respectively represent a width and a height of the reference image, a value of N' is not larger than the width and the height of the reference image and is an integer power of 2, $I_{M_{p'}}(x', y')$ represents a gray level of a pixel having a coordinate of (x', y') in the reference image $I_{M_{p'}}$ acquired at the magnification of $M_{p'}$, $I_{M_{p'}}(x'+1, y')$ represents a gray level of a pixel having a coordinate of (x'+1, y') in the reference image $I_{M_{p'}}$ acquired at the magnification of $M_{p'}$, $I_{M_{p'}}(x', y'+1)$ represents a gray level of a pixel having a coordinate of (x', y'+1) in the reference image $I_{M_{p'}}$ acquired at the magnification of $M_{p'}$; and ④-3, comparing the relatively clearest position at each of the P different magnifications acquired in the operations in step ① to step ③ with the parfocal position of the reference image acquired at each of the P different magnifications one by one, judging whether the relatively clearest position at each of the P different magnifications acquired in the operations in step ① to step ③ is the parfocal position, for the relatively clearest position at the magnification of $M_{p'}$ acquired in the operations in step ① to step ③, wherein $M_{p'}$ is the No. p' magnification in the P different magnifications, setting a judging condition of the relatively clearest position as $$\text{Parfocality} = \begin{cases} \text{parfocal,} & \text{if } \frac{|F_{C_1}(I_{M_{p'}}) - F_{C_1}(I_{M_{p'}, \theta^{M_{p'}}})|}{F_{C_1}(I_{M_{p'}})} < \alpha_{p'} \\ \text{not parfocal,} & \text{if } \frac{|F_{C_1}(I_{M_{p'}}) - F_{C_1}(I_{M_{p'}, \theta^{M_{p'}}})|}{F_{C_1}(I_{M_{p'}})} \geq \alpha_{p'} \end{cases}$$

wherein $\theta^{M_{p'}}$ represents the focusing knob angle corresponding to the relatively clearest position at the magnification of $M_{p'}$ in the P different magnifications acquired in the operations in step ① to step ③, $$F_{C_1}(I_{M_{p'}, \theta^{M_{p'}}})$$

represents the highest definition corresponding to the relatively clearest position in the magnification of $M_{p'}$ in the P different magnifications, calculated according to the gradient square function $F_{C_1}(\ )$ in the operations in step ① to step ③, the symbol "||" is an absolute value symbol, and $\alpha_{p'}$ represents a threshold value for judging the parfocality at the magnification of $M_{p'}$.

5. The method for detecting the parfocality of the zoom-stereo microscope, as recited in claim 4, wherein a value of $\alpha_{p'}$ in step ④-3 depends on the magnification; when the magnification is 6.5, the value of $\alpha_{p'}$ is 0.30%; when the magnification is 5, the value of $\alpha_{p'}$ is 0.56%; when the magnification is 4, the value of $\alpha_{p'}$ is 0.06%; when the magnification is 2, the value of $\alpha_{p'}$ is 1.40%; when the magnification is 1, the value of $\alpha_{p'}$ is 0.038%; and when the magnification is 0.8, the value of $\alpha_{p'}$ is 0.10%.

6. The method for detecting the parfocality of the zoom-stereo microscope, as recited in claim 4, wherein when the zoom-stereo microscope is judged as the qualified product in the step ④, a parfocal curve of the zoom-stereo microscope is able to be fitted, and that is to fit the parfocal curve of the zoom-stereo microscope via a least square method, according to the parfocal positions at each of the P different magnifications in the step ④, the parfocal curve is represented in a polynomial form as $d(M) = a_0 + a_1 M + a_2 M^2 + L + a_L M^L$, wherein d represents a distance between an objective lens and an objective table of the zoom-stereo microscope when the zoom-stereo microscope is parfocal, d(M) represents the parfocal curve, consisting of the distances between the objective lens and the objective table corresponding to the parfocal positions at each of the P different magnifications acquired in step ④, M represents the magnification, $M^2$ represents a second power of M, $M^L$ represents a No. L power of M, $M \in \{M_1, M_2, L, M_{P-1}, M_P\}$, represent the P different magnifications, $a_0, a_1, a_2, \ldots, a_L$ represent undetermined coefficients in $d(M)=a_0+a_1M+a_2M^2+L+a_LM^L$, L represents an order of the parfocal curve.

7. The method for detecting the parfocality of the zoom-stereo microscope, as recited in claim 6, wherein after the zoom-stereo microscope is judged as the qualified product in the step ④, fitting the parfocal curve of the zoom-stereo microscope comprises:

a, calculating a height of the objective lens of the zoom-stereo microscope at each of the P different magnifications acquired in the step ④, when the parfocal position is at $\theta^{M_{p'}}$, denoting the height of the objective lens as $d_{M_{p'}}$, wherein $M_{p'}$ is the No. p' magnification in the P different magnifications, $\theta^{M_{p'}}$ is the parfocal position at the magnification of $M_{p'}$, $d_{M_{p'}} = d_0 + \theta^{M_{p'}} \times d$, $d_0$ represents the height of the objective lens when the focusing knob is in the benchmark position, $\Delta d$ represents a distance the objective lens moves after the focusing knob is turned by 1 degree, $$\Delta d = \frac{d_{max} - d_{min}}{n},$$

$d_{max}$ represents the height of the objective lens when the focusing knob adjusts the objective lens to a highest position, $d_{min}$ represents the height of the objective lens when the focusing knob adjusts the objective lens to a lowest position, n represents the degrees the focusing knob is turned by in a course that the focusing knob adjusts the objective lens from the lowest position to the highest position, and a unit of n is degree;

b, forming P discrete points with each magnification in the P different magnifications and the corresponding height of the objective lens, wherein $M_{p'}$ is the No. p' magnification in the P different magnifications, $M_{p'}$ and the corresponding height of the objective lens $d_{M_{p'}}$ form a discrete point, which is denoted as $(M_{p'}, d_{M_{p'}})$;

c, constructing the parfocal curve of the zoom-stereo microscope, which is denoted as $d(M)=a_0+a_1M+a_2M^2+L+a_LM^L$, acquiring sum of squares of errors of the P discrete points according to $d(M)=a_0+a_1M+a_2M^2+L+a_LM^L$, which is denoted as $T(a_0, a_1, L, a_L)$ wherein $$T(a_0, a_1, L, a_L) = \sum_{i=1}^{P} ((a_0 + a_1 M_i + a_2 M_i^2 + L + a_L M_i^L) - d_{M_i})^2,$$

a partial derivative of each of undetermined coefficients in $$T(a_0, a_1, L, a_L) = \sum_{i=1}^{P} ((a_0 + a_1 M_i + a_2 M_i^2 + L + a_L M_i^L) - d_{M_i})^2$$

is set to zero to minimize $T(a_0, a_1, L, a_L)$, namely $$\frac{\partial T}{\partial a_l} = 2\sum_{i=1}^{P} ((a_0 + a_1 M_i + a_2 M_i^2 + L + a_L M_i^L) - d_{M_i})M_i^l = 0,$$

$M_i$ represents a No. i magnification in the P different magnifications, $d_{M_i}$ represents the height of the objective lens of the zoom-stereo microscope corresponding to the parfocal position at the magnification of $M_i$, $M_i^l$ represents a No. l power of $M_i$, and $1 \leq l \leq L$; and d, calculating values of the undetermined coefficients in $d(M)=a_0+a_1M+a_2M^2+L+a_LM^L$ according to the step c, and finally acquiring the parfocal curve of the zoom-stereo microscope according to the values of the undetermined coefficients.

8. The method for detecting the parfocality of the zoom-stereo microscope, as recited in claim 7, wherein the height of the objective lens is a distance between a bottom of the objective lens and the objective table.

9. The method for detecting the parfocality of the zoom-stereo microscope, as recited in claim 7, wherein the benchmark position is the position of the focusing knob when the image is relatively clearest at the highest magnification and the focusing knob angle is 0 degree.

10. The method for detecting the parfocality of the zoom-stereo microscope, as recited in claim 1, wherein respectively calculating the definitions of the Q×T images acquired at Q different focusing knob angles and the magnification of M according to the four definition judging functions in the step ③, comprises:

③-1, respectively defining the four definition judging functions as a gradient square function, an image variance function, a discrete Fourier transform function and a Walsh-Hadamard transform function, and respectively denoting the four definition judging functions as $F_{C_1}(\ )$, $F_{C_2}(\ )$, $F_{C_3}(\ )$ and $F_{C_4}(\ )$;

③-2, in the Q×T images acquired at the Q different focusing knob angles, defining the No. k' image processed at present as a present image, denoted as $I_{Mk'}$, wherein $1 \leq k' \leq Q \times T$;

③-3, calculating a first definition of the present image according to the gradient square function $F_{C_1}(\ )$, and denoting the first definition as $F_{C_1}(I_{Mk'})$, wherein $$F_{C_1}(I_{Mk'}) = \sum_{x=\frac{W-N}{2}}^{\frac{W+N}{2}-1} \sum_{y=\frac{H-N}{2}}^{\frac{H+N}{2}-1} [(I_{Mk'}(x, y) - I_{Mk'}(x+1, y))^2 + (I_{Mk'}(x, y) - I_{Mk'}(x, y+1))^2],$$

W and H respectively represent a width and a height of the present image, a value of N is not larger than the width and the height of the present image and is an integer power of 2, $I_{Mk'}(x, y)$ represents a gray level of a pixel having a coordinate of (x, y) in the present image, $I_{Mk'}(x+1, y)$ represents a gray level of a pixel having a coordinate of (x+1, y) in the present image, $I_{Mk'}(x, y+1)$ represents a gray level of a pixel having a coordinate of (x, y+1) in the present image;

③-4, calculating a second definition of the present image according to the image variance function $F_{C_2}(\ )$, and denoting the second definition as $F_{C_2}(I_{Mk'})$, wherein $$F_{C_2}(I_{Mk'}) = \sum_{x=\frac{W-N}{2}}^{\frac{W+N}{2}-1} \sum_{y=\frac{H-N}{2}}^{\frac{H+N}{2}-1} [(I_{Mk'}(x,y) - \overline{I_{Mk'}(x,y)})]^2,$$

and $$\overline{I_{Mk'}(x,y)} = \frac{1}{N^2} \sum_{x=\frac{W-N}{2}}^{\frac{W+N}{2}-1} \sum_{y=\frac{H-N}{2}}^{\frac{H+N}{2}-1} I_{Mk'}(x,y);$$

③-5, calculating a third definition of the present image according to the discrete Fourier transform function $F_{C_3}$ ( ), and denoting the third definition as $F_{C_3}(I_{Mk'})$, wherein $$F_{C_3}(I_{Mk'}) = \sum_{u=0}^{N-1} \sum_{v=0}^{N-1} F_{Mk'}(u,v),$$

$F_{Mk'}(u, v)$ represents a discrete Fourier transform of $I_{Mk'}(x, y)$, $$F_{Mk'}(u,v) = \sum_{x=\frac{W-N}{2}}^{\frac{W+N}{2}-1} \sum_{y=\frac{H-N}{2}}^{\frac{H+N}{2}-1} I_{Mk'}(x,y) e^{-j2\pi\left(\frac{ux}{N}+\frac{vy}{N}\right)},$$

and j represents a imaginary unit;

③-6, calculating a fourth definition of the present image according to the Walsh-Hadamard transform function $F_{C_4}$ ( ), and denoting the fourth definition as $F_{C_4}(I_{Mk'})$, wherein $$F_{C_4}(I_{Mk'}) = \sum_{u=0}^{N-1} \sum_{v=0}^{N-1} W_{Mk'}(u,v),$$

$W_{Mk'}(u, v)$ represents a Walsh-Hadamard transform of $I_{Mk'}(x, y)$, $$W_{Mk'}(u,v) = \frac{1}{N^2} \sum_{x=\frac{W-N}{2}}^{\frac{W+N}{2}-1} \sum_{y=\frac{H-N}{2}}^{\frac{H+N}{2}-1} w_N(u,x) I_{Mk'}(x,y) w_N(v,y),$$

wherein $w_N(u, x)$ and $w_N(v, y)$ both represent kernel functions of the Walsh-Hadamard transform, $$w_N(u,x) = \prod_{r=0}^{p-1} (-1)^{u_r u_x},$$

and $$w_N(v,y) = \prod_{r=0}^{p-1} (-1)^{v_r v_y},$$

$p=\log_2 N$, $u_r$ represents a No. r digit of a binary form of u, $u_x$ represents a No. x digit of the binary form of u, $v_r$ represents a No. r digit of a binary form of v, and $v_y$ represents a No. y digit of the binary form of v; and ③-7, let k'=k'+1, wherein "=" is an assignment symbol, in the Q×T images acquired at the Q different focusing knob angles, defining a next image to be processed as the present image, and then returning to the step ③-3, until acquiring four definitions of each of the Q×T images acquired at the Q different focusing knob angles.

11. The method for detecting the parfocality of the zoom-stereo microscope, as recited in claim 10, wherein whether the relatively clearest position at each of the P different magnifications is the parfocal position is judged according to the parfocality judging method, which comprises:

④-1, turning a magnification knob of another zoom-stereo microscope, then acquiring P parfocal clear images at the P different magnifications with a calibration target, forming a group of reference images with the P parfocal clear images, and defining the parfocal clear image acquired with the calibration target at the magnification of $M_{p'}$ as the reference image at the magnification of $M_{p'}$, wherein $M_{p'}$ is a No. p' magnification in the P different magnifications, the reference image is denoted as $I_{M_{p'}}$, and $1 \leq p' \leq P$;

④-2, calculating P definitions of the reference images acquired at each of the P different magnifications according to the gradient square function $F_{C_1}$ ( ), denoting the definition of the reference image $I_{M_{p'}}$ acquired at the magnification of $M_{p'}$ as $F_{C_1}(I_{M_{p'}})$, wherein $M_{p'}$ is the No. p' magnification in the P different magnifications, $$F_{C_1}(I_{M_{p'}}) = \sum_{x'=\frac{W'-N'}{2}}^{\frac{W'+N'}{2}-1} \sum_{y'=\frac{H'-N'}{2}}^{\frac{H'+N'}{2}-1} [(I_{M_{p'}}(x',y') - I_{M_{p'}}(x'+1,y'))^2 + (I_{M_{p'}}(x',y') - I_{M_{p'}}(x',y'+1))^2],$$

W' and H' respectively represent a width and a height of the reference image, a value of N' is not larger than the width and the height of the reference image and is an integer power of 2, $I_{M_{p'}}(x', y')$ represents a gray level of a pixel having a coordinate of (x', y') in the reference image $I_{M_{p'}}$ acquired at the magnification of $M_{p'}$, $I_{M_{p'}}(x'+1, y')$ represents a gray level of a pixel having a coordinate of (x'+1, y') in the reference image $I_{M_{p'}}$ acquired at the magnification of $M_{p'}$, $I_{M_{p'}}(x', y'+1)$ represents a gray level of a pixel having a coordinate of (x', y'+1) in the reference image $I_{M_{p'}}$ acquired at the magnification of $M_{p'}$; and ④-3, comparing the relatively clearest position at each of the P different magnifications acquired in the operations in step ① to step ③ with the parfocal position of the reference image acquired at each of the P different magnifications one by one, judging whether the relatively clearest position at each of the P different magnifications acquired in the operations in step ① to step ③ is the parfocal position, for the relatively clearest position at the magnification of $M_{p'}$ acquired in the operations in step ① to step ③, wherein $M_{p'}$ is the No. p' magnification in the P different magnifications, setting a judging condition of the relatively clearest position as $$\text{Parfocality} = \begin{cases} \text{parfocal,} & \text{if } \frac{\left|F_{C_1}(I_{M_{p'}}) - F_{C_1}(I_{M_{p'},\theta^{M_{p'}}})\right|}{F_{C_1}(I_{M_{p'}})} < \alpha_{p'} \\ \text{not parfocal,} & \text{if } \frac{\left|F_{C_1}(I_{M_{p'}}) - F_{C_1}(I_{M_{p'},\theta^{M_{p'}}})\right|}{F_{C_1}(I_{M_{p'}})} \geq \alpha_{p'}, \end{cases}$$

wherein $\theta^{M_{p'}}$ represents the focusing knob angle corresponding to the relatively clearest position at the magnification of $M_{p'}$ in the P different magnifications acquired in the operations in step ① to step ③, $$F_{C_1}(I_{M_{p'},\theta^{M_{p'}}})$$

represents the highest definition corresponding to the relatively clearest position in the magnification of $M_{p'}$ in the P different magnifications, calculated according to the gradient square function $F_{C_1}()$ in the operations in step ① to step ③, the symbol "||" is an absolute value symbol, and $\alpha_{p'}$ represents a threshold value for judging the parfocality at the magnification of $M_{p'}$.

12. The method for detecting the parfocality of the zoom-stereo microscope, as recited in claim 11, wherein a value of $\alpha_{p'}$ in step ④-3 depends on the magnification; when the magnification is 6.5, the value of $\alpha_{p'}$ is 0.30%; when the magnification is 5, the value of $\alpha_{p'}$ is 0.56%; when the magnification is 4, the value of $\alpha_{p'}$ is 0.06%; when the magnification is 2, the value of $\alpha_{p'}$ is 1.40%; when the magnification is 1, the value of $\alpha_{p'}$ is 0.038%; and when the magnification is 0.8, the value of $\alpha_{p'}$ is 0.10%.

13. The method for detecting the parfocality of the zoom-stereo microscope, as recited in claim 11, wherein when the zoom-stereo microscope is judged as the qualified product in the step ④, a parfocal curve of the zoom-stereo microscope is able to be fitted, and that is to fit the parfocal curve of the zoom-stereo microscope via a least square method, according to the parfocal positions at each of the P different magnifications in the step ④, the parfocal curve is represented in a polynomial form as $d(M) = a_0 + a_1 M + a_2 M^2 + L + a_L M^L$, wherein d represents a distance between an objective lens and an objective table of the zoom-stereo microscope when the zoom-stereo microscope is parfocal, d(M) represents the parfocal curve, consisting of the distances between the objective lens and the objective table corresponding to the parfocal positions at each of the P different magnifications acquired in step ④, M represents the magnification, $M^2$ represents a second power of M, $M^L$ represents a No. L power of M, $M \in \{M_1, M_2, L, M_{P-1}, M_P\}$, $M_1, M_2, L, M_{P-1}, M_P$ represent the P different magnifications, $a_0, a_1, a_2, \ldots, a_L$ represent undetermined coefficients in $d(M) = a_0 + a_1 M + a_2 M^2 + L + a_L M^L$, L represents an order of the parfocal curve.

14. The method for detecting the parfocality of the zoom-stereo microscope, as recited in claim 13, wherein after the zoom-stereo microscope is judged as the qualified product in the step ④, fitting the parfocal curve of the zoom-stereo microscope comprises:

a, calculating a height of the objective lens of the zoom-stereo microscope at each of the P different magnifications acquired in the step ④, when the parfocal position is at $\theta^{M_{p'}}$ denoting the height of the objective lens as $d_{M_{p'}}$ wherein is the No. p' magnification in the P different magnifications, $\theta^{M_{p'}}$ is the parfocal position at the magnification of $M_{p'}$, $d_{M_{p'}} = d_0 + \theta^{M_{p'}} \times \Delta d$, $d_0$ represents the height of the objective lens when the focusing knob is in the benchmark position, $\Delta d$ represents a distance the objective lens moves after the focusing knob is turned by 1 degree, $$\Delta d = \frac{d_{max} - d_{min}}{n},$$

$d_{max}$ represents the height of the objective lens when the focusing knob adjusts the objective lens to a highest position, $d_{min}$ represents the height of the objective lens when the focusing knob adjusts the objective lens to a lowest position, n represents the degrees the focusing knob is turned by in a course that the focusing knob adjusts the objective lens from the lowest position to the highest position, and a unit of n is degree;

b, forming P discrete points with each magnification in the P different magnifications and the corresponding height of the objective lens, wherein $M_{p'}$ is the No. p' magnification in the P different magnifications, $M_{p'}$ and the corresponding height of the objective lens $d_{M_{p'}}$ form a discrete point, which is denoted as $(M_{p'}, d_{M_{p'}})$;

c, constructing the parfocal curve of the zoom-stereo microscope, which is denoted as $d(M) = a_0 + a_1 M + a_2 M^2 + L + a_L M^L$, acquiring sum of squares of errors of the P discrete points according to $d(M) = a_0 + a_1 M + a_2 M^2 + L + a_L M^L$, which is denoted as $T(a_0, a_1, L, a_L)$ wherein $$T(a_0, a_1, L, a_L) = \sum_{i=1}^{P} ((a_0 + a_1 M_i + a_2 M_i^2 + L + a_L M_i^L) - d_{M_i})^2,$$

a partial derivative of each of undetermined coefficients in $$T(a_0, a_1, L, a_L) = \sum_{i=1}^{P} ((a_0 + a_1 M_i + a_2 M_i^2 + L + a_L M_i^L) - d_{M_i})^2$$

is set to zero to minimize $T(a_0, a_1, L, a_L)$, namely $$\frac{\partial T}{\partial a_l} = 2 \sum_{i=1}^{P} ((a_0 + a_1 M_i + a_2 M_i^2 + L + a_L M_i^L) - d_{M_i}) M_i^l = 0,$$

$M_i$ represents a No. i magnification in the P different magnifications, $d_{M_i}$ represents the height of the objective lens of the zoom-stereo microscope corresponding to the parfocal position at the magnification of $M_i$, $M_i^l$ represents a No. l power of $M_i$, and $1 \leq l \leq L$; and d, calculating values of the undetermined coefficients in $d(M) = a_0 + a_1 M + a_2 M^2 + L + a_L M^L$ according to the step c, and finally acquiring the parfocal curve of the zoom-stereo microscope according to the values of the undetermined coefficients.

15. The method for detecting the parfocality of the zoom-stereo microscope, as recited in claim 14, wherein the height of the objective lens is a distance between a bottom of the objective lens and the objective table.

16. The method for detecting the parfocality of the zoom-stereo microscope, as recited in claim 14, wherein the benchmark position is the position of the focusing knob when the image is relatively clearest at the highest magnification and the focusing knob angle is 0 degree.

* * * * *